(12) United States Patent
Koskinen et al.

(10) Patent No.: US 10,111,148 B2
(45) Date of Patent: Oct. 23, 2018

(54) APPARATUS AND METHOD FOR INTERWORKING OPTIMIZATION IN CONNECTION WITH CELLULAR HANDOVER

(71) Applicant: Nokia Technologies Oy, Espoo (FI)

(72) Inventors: Jussi-Pekka Koskinen, Oulu (FI); Jarkko Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 230 days.

(21) Appl. No.: 14/830,463

(22) Filed: Aug. 19, 2015

(65) Prior Publication Data

US 2016/0057680 A1    Feb. 25, 2016

Related U.S. Application Data (60) Provisional application No. 62/039,881, filed on Aug. 20, 2014.

(51) Int. Cl.
| | | |
|---|---|---|
| *H04W 36/22* | (2009.01) | |
| *H04W 36/00* | (2009.01) | |
| *H04W 36/14* | (2009.01) | |

(52) U.S. Cl.
CPC ....... *H04W 36/22* (2013.01); *H04W 36/0072* (2013.01); *H04W 36/14* (2013.01)

(58) Field of Classification Search
None
See application file for complete search history.

(56) References Cited

U.S. PATENT DOCUMENTS

| | | | | |
|---|---|---|---|---|
| 7,640,036 | B2 * | 12/2009 | Kallio ............... | H04W 36/0066 455/436 |
| 8,219,093 | B2 * | 7/2012 | Lee .................... | H04W 36/0083 455/436 |
| 8,275,376 | B2 * | 9/2012 | Vikberg ............. | H04L 12/2854 370/328 |
| 8,335,193 | B2 * | 12/2012 | Shukla ................. | H04W 36/30 370/331 |
| 8,526,958 | B2 * | 9/2013 | Niska ................ | H04W 36/0077 370/331 |
| 8,565,744 | B2 * | 10/2013 | Taaghol ................ | H04W 36/04 370/329 |

(Continued)

OTHER PUBLICATIONS

U.S. Appl. No. 61/903,915, "Techniques for Determining Traffic Volumes served over multiple cells of a wireless communication network", Griot et al. filed Nov. 13, 2013.*

*Primary Examiner* — Gregory B Sefcheck
(74) *Attorney, Agent, or Firm* — Nokia Technologies Oy (57) ABSTRACT

One embodiment is directed to a method comprising receiving and storing a set of cellular network and unlicensed frequency network interworking parameters from a cellular source cell; offloading data traffic from the cellular source cell to an unlicensed frequency network based on the stored set of interworking parameters; receiving a handover command including a second set of cellular network and unlicensed frequency network interworking parameters; checking whether information regarding unlicensed frequency network has been received from a cellular target cell; and if the information regarding unlicensed frequency network has not been received, determining whether to use the second set of cellular network and unlicensed frequency network interworking parameters after the handover.

20 Claims, 5 Drawing Sheets

(56) References Cited

U.S. PATENT DOCUMENTS

| | | | | |
|---|---|---|---|---|
| 8,566,455 B1* | 10/2013 | Zhao | H04W 76/025 |
| | | | 709/227 |
| 8,577,375 B2* | 11/2013 | Lee | H04W 36/14 |
| | | | 455/436 |
| 8,874,124 B2* | 10/2014 | Clegg | H04L 5/0062 |
| | | | 455/450 |
| 9,001,786 B2* | 4/2015 | Wang | H04W 36/385 |
| | | | 370/331 |
| 9,025,536 B2* | 5/2015 | Krishnaswamy | H04W 72/085 |
| | | | 370/329 |
| 9,264,968 B2* | 2/2016 | Tabet | H04W 36/30 |
| 9,485,699 B2* | 11/2016 | Goldhamer | H04W 36/22 |
| 9,554,283 B2* | 1/2017 | Tabet | H04W 16/14 |
| 9,763,151 B2* | 9/2017 | Kim | H04W 36/04 |
| 9,844,082 B1* | 12/2017 | Zhao | H04W 76/02 |
| 9,867,070 B2* | 1/2018 | Luo | H04W 24/08 |
| 2009/0285183 A1* | 11/2009 | Wu | H04L 47/80 |
| | | | 370/331 |
| 2012/0258685 A1* | 10/2012 | Wang | H04L 43/08 |
| | | | 455/405 |
| 2014/0287754 A1* | 9/2014 | Goldhamer | H04W 36/22 |
| | | | 455/436 |
| 2015/0133081 A1* | 5/2015 | Griot | H04L 12/1435 |
| | | | 455/407 |
| 2016/0119791 A1* | 4/2016 | Koskinen | H04W 48/08 |
| | | | 455/454 |
| 2017/0156086 A1* | 6/2017 | Tomici | H04W 36/14 |
| 2017/0164419 A1* | 6/2017 | Kim | H04W 76/028 |
| 2017/0171782 A1* | 6/2017 | Mohamed | H04W 36/0022 |

* cited by examiner

APPARATUS AND METHOD FOR INTERWORKING OPTIMIZATION IN CONNECTION WITH CELLULAR HANDOVER

RELATED APPLICATIONS

This application relates to, and claims the benefit of U.S. application filing No. 62/039,881, entitled, "Apparatus and method for interworking optimization in connection with cellular handover", filed on Aug. 20, 2014, which is hereby incorporated by reference in its entirety.

TECHNICAL FIELD

The present application relates generally to an apparatus and a method for interworking optimization in connection with cellular handover.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application.

As the number of wireless cellular data communication devices continues to increase and as their data capabilities continue to be more and more heavily used, the usage on the available frequencies dedicated to cellular data communication comes closer and closer to saturation. One approach to the management of traffic load is the offloading of traffic onto unlicensed frequencies, such as those used by wireless local area networks, WLAN, whose presence may be represented by one or more access points, APs. Network operators may implement wireless network infrastructure, which uses unlicensed frequencies, and manage the transfer of traffic between base stations using licensed frequencies and unlicensed network access points. Such an approach may be used, for example, by 3rd Generation Partnership Project, 3GPP, long term evolution, LTE or LTE-advanced, LTE-A, networks. The efficient use of unlicensed frequencies and the efficient transfer of traffic between licensed frequencies and access points using unlicensed frequencies has the potential to greatly increase wireless data capacity.

SUMMARY

Various aspects of examples of the invention are set out in the claims.

According to a first aspect of the present invention, a method may include receiving and storing a set of cellular network and unlicensed frequency network interworking parameters from a cellular source cell; offloading data traffic from the cellular source cell to an unlicensed frequency network based on the stored set of interworking parameters; receiving a handover command including a second set of cellular network and unlicensed frequency network interworking parameters; checking whether information regarding unlicensed frequency network has been received from a cellular target cell; and if the information regarding unlicensed frequency network has not been received, determining whether to use the second set of cellular network and unlicensed frequency network interworking parameters after the handover.

According to a second aspect of the present invention, an apparatus may include at least one processor, and at least one memory including computer program code, wherein the at least one memory and the computer program code configured to, with the at least one processor, cause the apparatus at least to receive and store a set of cellular network and unlicensed frequency network interworking parameters from a cellular source cell; offload data traffic from the cellular source cell to an unlicensed frequency network based on the stored set of interworking parameters; receive a handover command including a second set of cellular network and unlicensed frequency network interworking parameters; check whether information regarding unlicensed frequency network has been received from a cellular target cell; and if the information regarding unlicensed frequency network has not been received, determine whether to use the second set of cellular network and unlicensed frequency network interworking parameters after the handover.

According to a third aspect of the present invention, a computer program product comprising a computer-readable medium bearing computer program code embodied therein for use with a computer, the computer program code may include code for receiving and storing a set of cellular network and unlicensed frequency network interworking parameters from a cellular source cell; code for offloading data traffic from the cellular source cell to an unlicensed frequency network based on the stored set of interworking parameters; code for receiving a handover command including a second set of cellular network and unlicensed frequency network interworking parameters; code for checking whether information regarding unlicensed frequency network has been received from a cellular target cell; and code for if the information regarding unlicensed frequency network has not been received, determining whether to use the second set of cellular network and unlicensed frequency network interworking parameters after the handover.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
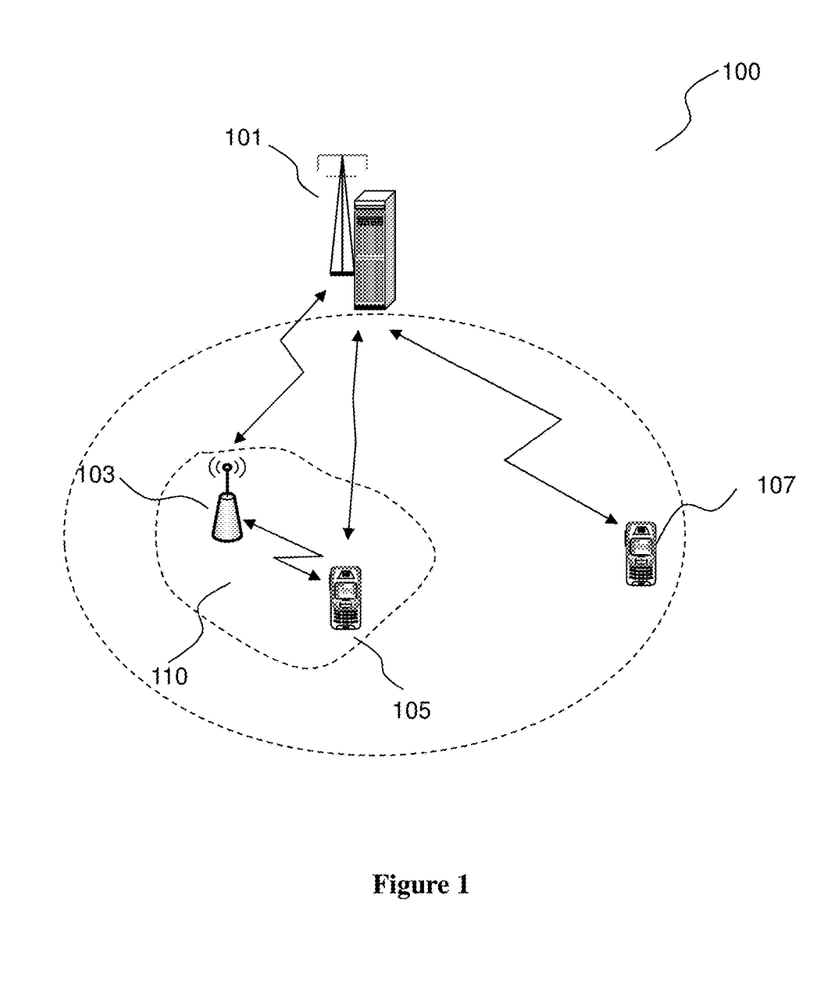
FIG. 1 illustrates an example wireless system in accordance with an example embodiment of the application.

FIG. 1 illustrates an example wireless system 100 in accordance with an example embodiment of the application. The example wireless system 100 comprises a $3^{rd}$ generation partnership project, 3GPP, evolved NodeB, eNB, 101 connecting to a core network that is not shown for brevity, and an unlicensed network such as for example, wireless local area networks, WLAN, access point, AP, 103. The macro cell eNB 101 is configured to communicate with one or more user equipment, UEs 105 and 107. The WLAN AP 103 may be configured to connect with the macro cell eNB 101 via a wireless link, and is configured to provide wireless connections in the WLAN local area 110 to devices, such as for example the UE 105, in order to offload traffic from eNB 101. Although just one macro cell eNB, one WLAN AP and two UEs are shown in FIG. 1, the example wireless system 100 may comprise more or less eNBs, WLAN APs and UEs.

The WLAN/3GPP radio interworking, IW, has been extensively discussed and the signaling of WLAN offloading configuration has already been specified. The configuration of thresholds for WLAN offloading parameters, including reference signal received power, RSRP, reference signal received quality, RSRQ, channel utilization, backhaul downlink/uplink bandwidth, etc., can be signaled in system information, such as for example, SIB 17. The configuration can also be included in dedicated signaling, i.e. radio resource control, RRC, connection reconfiguration message. On the other hand, the configuration of WLAN identifiers and the corresponding WLAN priorities are signaled in system information.

In the case of handover, HO, it is possible that the dedicated configuration of the thresholds for WLAN offloading parameters is signaled via a handover command, i.e. the RRC connection reconfiguration message including mobility control information. Upon receiving the handover command, the UE may apply the dedicated thresholds for WLAN offloading parameters included in the handover command, and initiates a handover to the target cell. Handover is considered successful if the UE completes the random access procedure in the target cell. After handover complete, the UE acquires system information and applies the configuration of WLAN identifiers and WLAN priorities included in system information of the target cell. Note that there is no clear requirements how long it can take for the UE to acquire system information, such as for example, SIB 17. If source and target cells are broadcasting different WLAN identifiers, the UE would potentially use not allowed WLAN.

In an example embodiment, a UE may start using WLAN/3GPP IW parameters received in HO command, such as for example, RRC Connection reconfiguration message with mobility control info, only after (or at point of) receiving WLAN identifiers from SIB17 of the target cell. During the time UE has not yet received broadcast (but has received new WLAN/3GPP IW parameters in HO command), the UE may or may not continue using old WLAN/3GPP IW parameters received from source cell. In an alternative example embodiment, during the time UE has not yet received broadcast (but has received new WLAN/3GPP IW parameters in HO command), the UE shall or shall not continue using old WLAN/3GPP IW parameters received from source cell.

In an example embodiment, information indicating whether same WLAN identifier received from the source cell can be used on the target cell is added to handover command. In an example embodiment, information indicating whether UE needs to acquire system information, such as for example, SIB 17, in the target cell may be sent to UE so that UE may continue using existing parameters if network indicates no need to acquire SIB 17.

In an example embodiment, information indicating where a WLAN identifier can be used in 3GPP/WLAN interworking may be indicated to UE. The information can be such as for example, an indication showing that the WLAN identifier can be used only in the cell where the information was received; in cells from a list of cells; in a public land mobile network, PLMN; in certain carrier or frequency; in certain tracking area/routing area/location area; or during the time of validity, and so on.

In an example embodiment, a WLAN identifier may be provided by dedicated signaling, such as for example, an HO command.

It should be noted that if a UE is not supposed to use old WLAN identifiers in a new cell after HO, the UE may still use old information until new WLAN identifier is received (i.e., UE may continue WLAN offloading) or UE does not use old information and is or is not allowed to continue WLAN offloading. This could be configurable by network.

Figure 2:
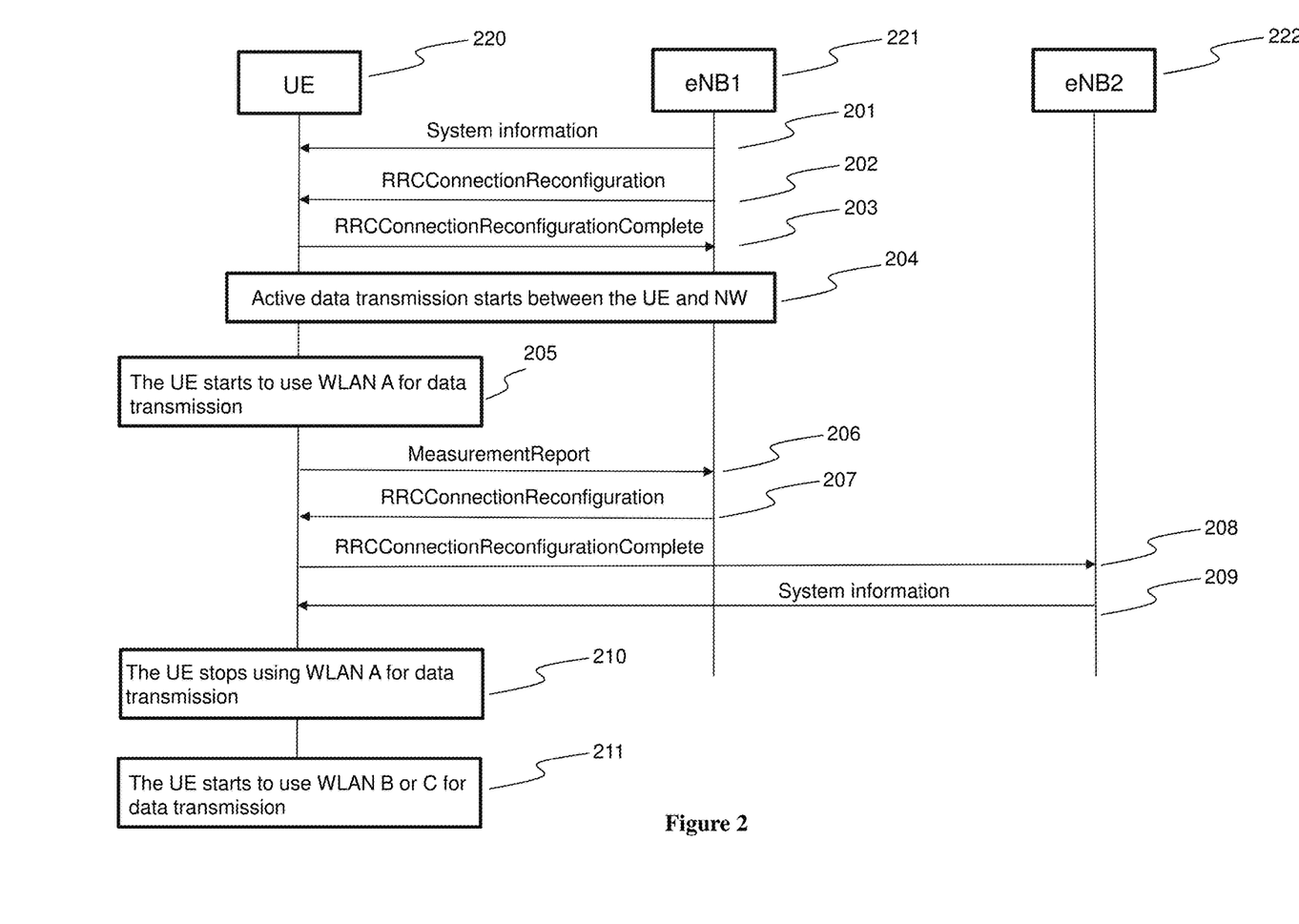
FIG. 2 illustrates an example of signaling utilized by a user equipment and a network in accordance with an example embodiment of the application.

FIG. 2 illustrates an example of signaling utilized by a UE and a network, NW, in accordance with an example embodiment of the application. In the example of FIG. 2, a UE 220, such as for example, the UE 105 of FIG. 1, is camping on a cell 1 under eNB1 221, such as for example, the eNB 101 of FIG. 1. The UE 220 reads system information at step 201 from eNB 1 221 where in this example three WLAN identifiers A, B and C are included for radio access network, RAN, assisted 3GPP/WLAN interworking. In the example of FIG. 2, the UE is in coverage area of WLAN A, such as for example, the WLAN area 110 of FIG. 1. At step 202, the NW transmits an RRCConnectionReconfiguration message on cell 1 to setup intra frequency measurement and to configure dedicated WLAN/3GPP interworking parameters. The UE transmits an RRCConnectionReconfigurationComplete message on cell 1 for confirmation at step 203. Active data transmission starts between the UE and the network at step 204 after the RRC connection is reconfigured. If a criteria for starting the use of WLAN A is fulfilled, the UE can start to use WLAN A for data transmission at step 205.

When the UE 220 moves geographically and a neighbor cell 2 under eNB2 222 becomes better than the serving cell 221 (i.e. criteria for measurement reporting is fulfilled), the UE may transmit a MeasurementReport message on cell 1 to report event at step 206. If the NW determines that the UE should handover to cell 2, the NW transmits an RRCConnectionReconfiguration message at step 207 to order the UE to perform the handover to cell 2. The new dedicated WLAN/3GPP interworking parameters may be included in the RRCConnectionReconfiguration message sent at step 207. At step 208, the UE transmits an RRCConnectionReconfigurationComplete message on cell 2 for confirmation of the handover. At this moment, if the UE is allowed to use old WLAN/3GPP interworking parameters to continue the offloading, the UE may still use WLAN A for data transmission if it is still in coverage area of WLAN A. After the handover, the UE may read system information at step 209 from cell 2 where in this example WLAN identifiers B and C are included for RAN assisted WLAN/3GPP interworking. Then the UE stops using WLAN A for data transmission at step 210 in this example, and may start to use WLAN B or C for offloading with the new dedicated WLAN/3GPP interworking parameters at step 211

Figure 3:
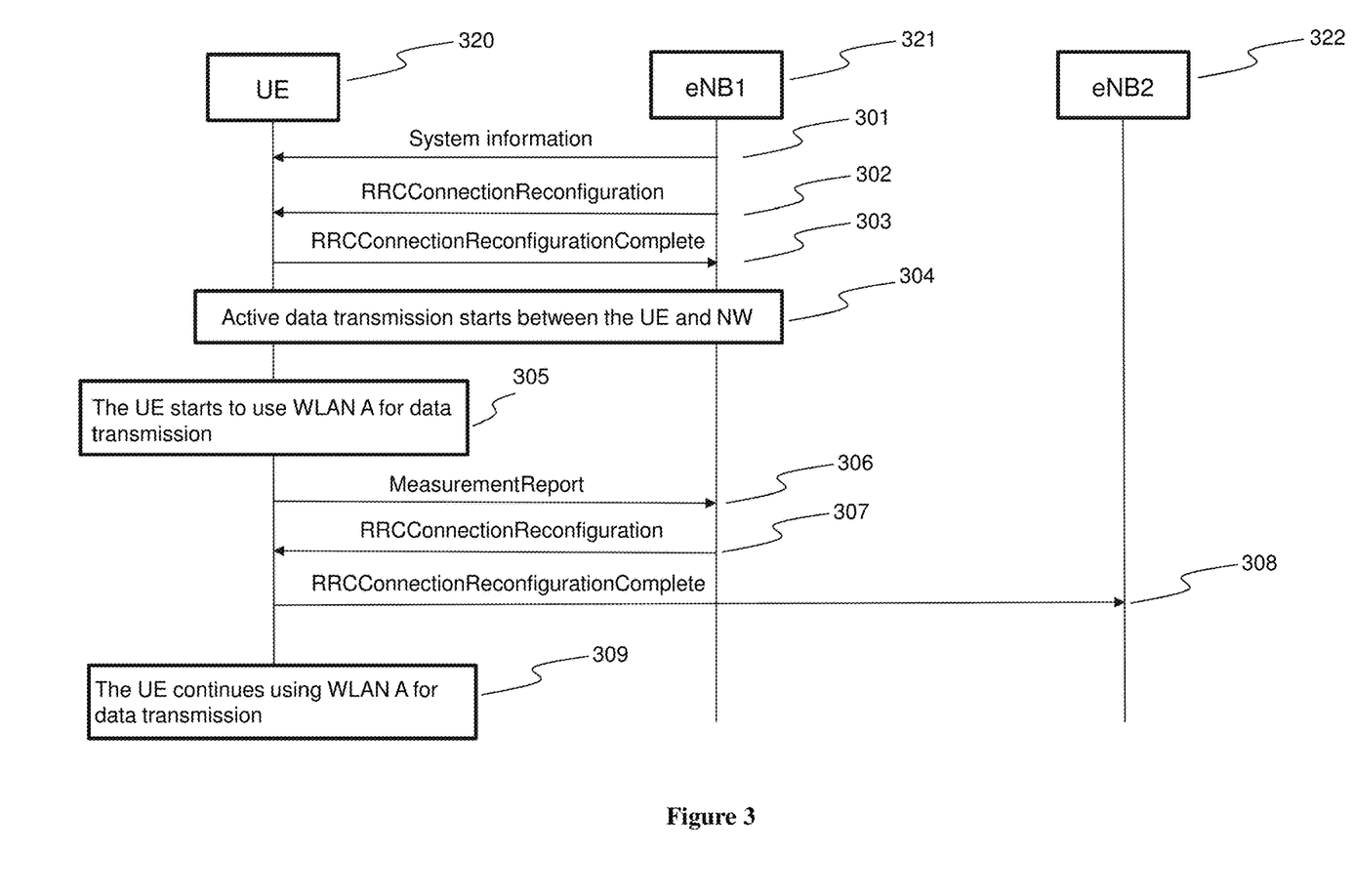
FIG. 3 illustrates another example of signaling utilized by a user equipment and a network in accordance with an example embodiment of the application.

FIG. 3 illustrates another example of signaling utilized by a UE and a network, NW, in accordance with an example embodiment of the application. In the example of FIG. 3, a UE 320, such as for example, the UE 105 of FIG. 1, is camping on a cell 1 under eNB1 321, such as for example, the eNB 101 of FIG. 1. The UE 320 reads system information at step 301 from eNB1 321 where in this example three WLAN identifiers A, B and C are included for RAN assisted 3GPP/WLAN interworking. In the example of FIG. 3, the UE is in coverage area of WLAN A, such as for example, the WLAN area 110 of FIG. 1. At step 302, the NW transmits an RRCConnectionReconfiguration message on cell 1 to setup intra frequency measurement and to configure dedicated WLAN/3GPP interworking parameters. The UE transmits an RRCConnectionReconfigurationComplete message on cell 1 for confirmation at step 303. Active data transmission starts between the UE and the network at step 304 after the RRC connection is reconfigured. If a criteria for starting the use of WLAN A is fulfilled, the UE can start to use WLAN A for data transmission at step 305.

When the UE 320 moves geographically and a neighbor cell 2 under eNB2 322 becomes better than the serving cell 321 (i.e. criteria for measurement reporting is fulfilled), the UE may transmit a MeasurementReport message on cell 1 to report event at step 306. If the NW determines that the UE should handover to cell 2, the NW transmits an RRCConnectionReconfiguration message at step 307 to order the UE to perform the handover to cell 2. The new dedicated WLAN/3GPP interworking parameters may be included in the RRCConnectionReconfiguration message sent at step 307. In the example of FIG. 3, information (such as for example, a flag set to TRUE) indicating that same WLAN identifiers can be used is also included in the message sent at step 307. At step 308, the UE transmits an RRCConnectionReconfigurationComplete message on cell 2 for confirmation of the handover. After the handover, based on the received information at step 307, the UE may continue using WLAN A for data transmission with new dedicated WLAN/3GPP interworking parameters at step 309 in this example, if the UE is still in the coverage area of WLAN A.

Figure 4:
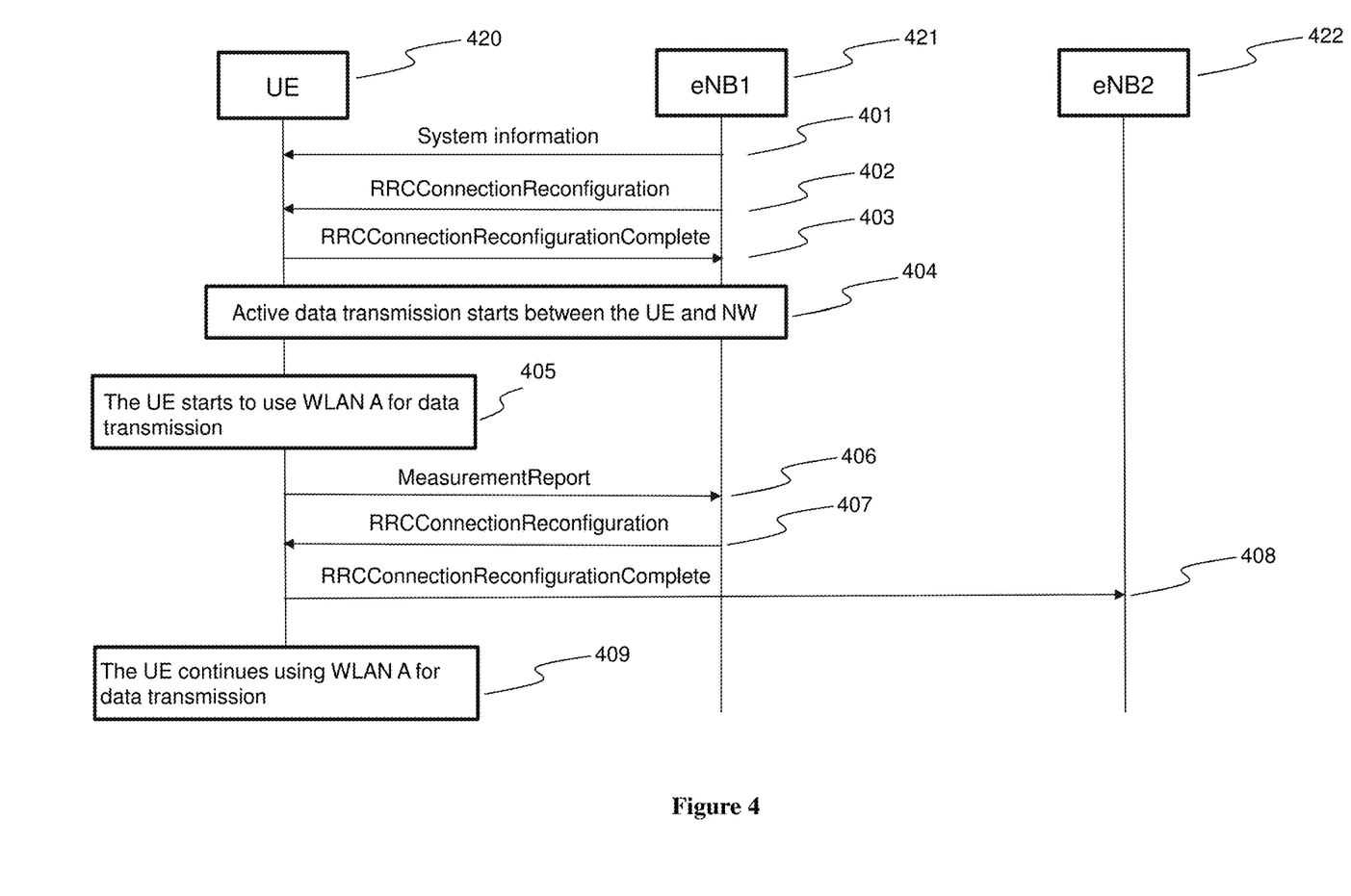
FIG. 4 illustrates another example of signaling utilized by a user equipment and a network in accordance with an example embodiment of the application.

FIG. 4 illustrates another example of signaling utilized by a UE and a network, NW, in accordance with an example embodiment of the application. In the example of FIG. 4, a UE 420, such as for example, the UE 105 of FIG. 1, is camping on a cell 1 with a cell global identifier 1 under eNB1 421, such as for example, the eNB 101 of FIG. 1. The UE 420 reads system information at step 401 from eNB 1 421 where in this example three WLAN identifiers A, B and C are included for RAN assisted 3GPP/WLAN interworking. The system information may also include information indicating that the WLAN A, B and C can be used in cells with cell global identifiers 1 and 2. In the example of FIG. 4, the UE is in coverage area of WLAN A, such as for example, the WLAN area 110 of FIG. 1. At step 402, the NW transmits an RRCConnectionReconfiguration message on cell 1 to setup intra frequency measurement and to configure dedicated WLAN/3GPP interworking parameters. The UE transmits an RRCConnectionReconfigurationComplete message on cell 1 for confirmation at step 403. Active data transmission starts between the UE and the network at step 404 after the RRC connection is reconfigured. If a criteria for starting the use of WLAN A is fulfilled, the UE can start to use WLAN A for data transmission at step 405.

When the UE 420 moves geographically and a neighbor cell 2 with a cell global identifier 2 under eNB2 422 becomes better than the serving cell 421 (i.e. criteria for measurement reporting is fulfilled), the UE may transmit a MeasurementReport message on cell 1 to report event at step 406. If the NW determines that the UE should handover to cell 2, the NW transmits an RRCConnectionReconfiguration message at step 407 to order the UE to perform the handover to cell 2. The new dedicated WLAN/3GPP interworking parameters may be included in the RRCConnectionReconfiguration message sent at step 407. At step 408, the UE transmits an RRCConnectionReconfigurationComplete message on cell 2 for confirmation of the handover. After the handover, based on the cell global identifier of cell 2, the UE may continue using WLAN A for data transmission with new dedicated WLAN/3GPP interworking parameters at step 409 in this example if the UE is still in the coverage area of WLAN A.

Figure 5:
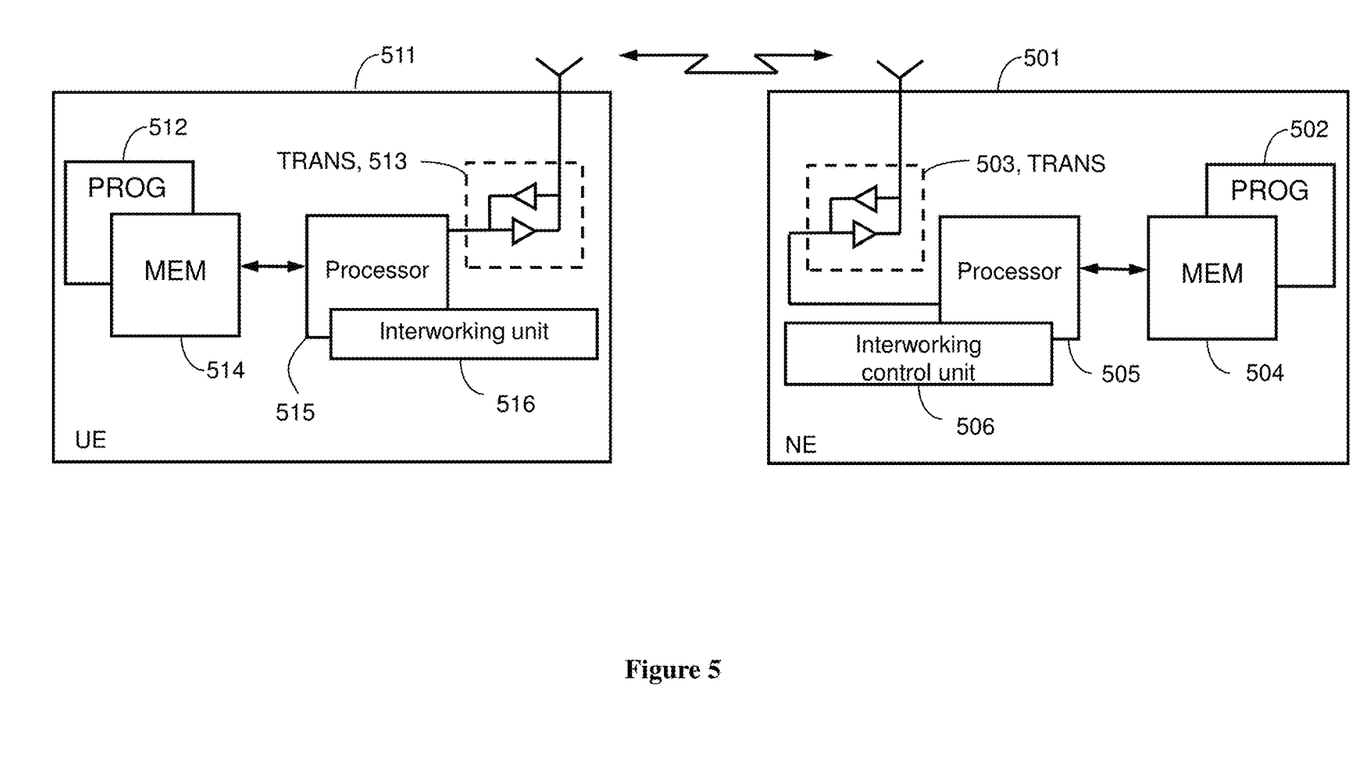
FIG. 5 illustrates a simplified block diagram of various example apparatuses that are suitable for use in practicing various example embodiments of this application.

Reference is made to FIG. 5 for illustrating a simplified block diagram of various example apparatuses that are suitable for use in practicing various example embodiments of this application. In FIG. 5, a network element, NE, 501, such as for example, the eNB 101, eNB 221, eNB 321 or eNB 421, is adapted for communication with a UE 511, such as for example, the UE 105, UE 220, UE 320 or UE 420. The UE 511 includes at least one processor 515, at least one memory (MEM) 514 coupled to the at least one processor 515, and a suitable transceiver (TRANS) 513 (having a transmitter (TX) and a receiver (RX)) coupled to the at least one processor 515. The at least one MEM 514 stores a program (PROG) 512. The TRANS 513 is for bidirectional wireless communications with the NE 501.

The NE 501 includes at least one processor 505, at least one memory (MEM) 504 coupled to the at least one processor 505, and a suitable transceiver (TRANS) 503 (having a transmitter (TX) and a receiver (RX)) coupled to the at least one processor 505. The at least one MEM 504 stores a program (PROG) 502. The TRANS 503 is for bidirectional wireless communications with the UE 511. The NE 501 may be coupled to one or more cellular networks or systems, which is not shown in this figure.

As shown in FIG. 5, the NE 501 may further include a WLAN/3GPP interworking control unit 506. The unit 506, together with the at least one processor 505 and the PROG 502, may be utilized by the NE 501 in conjunction with various example embodiments of the application, as described herein.

As shown in FIG. 5, the UE 511 may further include a WLAN/3GPP interworking unit 516. The unit 516, together with the at least one processor 515 and the PROG 512, may be utilized by the UE 511 in conjunction with various example embodiments of the application, as described herein.

At least one of the PROGs 502 and 512 is assumed to include program instructions that, when executed by the associated processor, enable the electronic apparatus to operate in accordance with the example embodiments of this disclosure, as discussed herein.

In general, the various example embodiments of the apparatus 511 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The example embodiments of this disclosure may be implemented by computer software or computer program code executable by one or more of the processors 505, 515 of the NE 501 and the UE 511, or by hardware, or by a combination of software and hardware.

The MEMs 504 and 514 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The processors 505 and 515 may be of any type suitable to the local technical environment, and may include one or more of general purpose computers, special purpose computers, microprocessors, digital signal processors (DSPs) and processors based on multi-core processor architecture, as non-limiting examples.

Without in any way limiting the scope, interpretation, or application of the claims appearing below, a technical effect of one or more of the example embodiments disclosed herein may be making UE behavior deterministic during network interworking in connection with cellular handover. This helps to improve the user experience.

Embodiments of the present invention may be implemented in software, hardware, application logic or a combination of software, hardware and application logic. The software, application logic and/or hardware may reside on an apparatus such as a user equipment, a NodeB or other mobile communication devices. If desired, part of the software, application logic and/or hardware may reside on a NE 501, part of the software, application logic and/or hardware may reside on a UE 511, and part of the software, application logic and/or hardware may reside on other chipset or integrated circuit. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device.

It is also noted herein that while the above describes example embodiments of the invention, these descriptions should not be viewed in a limiting sense. Rather, there are several variations and modifications which may be made without departing from the scope of the present invention as defined in the appended claims.

For example, it has been assumed that the interworking is between WLAN and 3GPP. It is straightforward to generalize the idea to cover the other type of networks.

Further, the various names used for the described parameters are not intended to be limiting in any respect, as these parameters may be identified by any suitable names. For example, different message other than 3GPP RRC signaling can be used as the dedicated signaling exchanged between UE and network.

If desired, the different functions discussed herein may be performed in a different order and/or concurrently with each other. Furthermore, if desired, one or more of the above-described functions may be optional or may be combined. As such, the foregoing description should be considered as merely illustrative of the principles, teachings and example embodiments of this invention, and not in limitation thereof.

We claim:

1. A method, comprising:
receiving and storing at a user equipment, a set of cellular network and unlicensed frequency network interworking parameters from a cellular source cell;
offloading at the user equipment, data traffic from the cellular source cell to an unlicensed frequency network based on the stored set of interworking parameters;
receiving at the user equipment, a handover command from the cellular source cell to handover from the cellular source cell to a cellular target cell, wherein the handover command includes a second set of cellular network and unlicensed frequency network interworking parameters;
checking at the user equipment, whether information regarding unlicensed frequency network has been received from the cellular target cell after the handover; and
if the information regarding unlicensed frequency network has not been received, determining at the user equipment, whether to use the second set of cellular network and unlicensed frequency network interworking parameters for offloading data traffic from the cellular target cell to the unlicensed frequency network after the handover from the cellular source cell to the cellular target cell.

2. The method of claim 1, further comprising:
if the information regarding unlicensed frequency network has not been received, determining to continue using the stored set of cellular network and unlicensed frequency network interworking parameters after the handover.

3. The method of claim 1, further comprising:
if the information regarding unlicensed frequency network has not been received, determining to stop using the stored set of cellular network and unlicensed frequency network interworking parameters after the handover.

4. The method of claim 1, further comprising:
if the information regarding unlicensed frequency network has been received, determining to stop using the stored set of cellular network and unlicensed frequency network interworking parameters and start using the second set of cellular network and unlicensed frequency network interworking parameters after the handover.

5. The method of claim 1, further comprising:
receiving at least one of an indicator indicating whether same information regarding unlicensed frequency network received from the cellular source cell can be used in the cellular target cell, and an indicator indicating whether to acquire information regarding unlicensed frequency network from the cellular target cell.

6. The method of claim 5, further comprising:
if the received indicator indicating that same information regarding unlicensed frequency network received from the cellular source cell can be used in the cellular target cell, determining to use the second set of cellular network and unlicensed frequency network interworking parameters after the handover.

7. The method of claim 1, further comprising:
receiving an indicator indicating that information regarding unlicensed frequency network received from the cellular source cell can be used only in the cell where the information was received; in cells from a list of cells; in a public land mobile network; in certain carrier or frequency; in certain tracking area/routing area/location area; or during the time of validity.

8. The method of claim 7, further comprising:
if the received indicator indicating that information regarding unlicensed frequency network received from the cellular source cell can be used in cells from a list of cells, and the cellular target cell belongs to the list of cells, determining to use the second set of cellular network and unlicensed frequency network interworking parameters after the handover.

9. An apparatus, comprising:
at least one processor;
and at least one memory including computer program code,
wherein the at least one memory and the computer program code are configured to, with the at least one processor, cause the apparatus at least to:
receive and store at a user equipment, a set of cellular network and unlicensed frequency network interworking parameters from a cellular source cell;
offload at the user equipment, data traffic from the cellular source cell to an unlicensed frequency network based on the stored set of interworking parameters;
receive at the user equipment, a handover command from the cellular source cell to handover from the cellular source cell to a cellular target cell, wherein the handover command includes a second set of cellular network and unlicensed frequency network interworking parameters;
check at the user equipment, whether information regarding unlicensed frequency network has been received from the cellular target cell after the handover; and
if the information regarding unlicensed frequency network has not been received, determine at the user equipment, whether to use the second set of cellular network and unlicensed frequency network interworking parameters for offloading data traffic from the cellular target cell to the unlicensed frequency network after the handover from the cellular source cell to the cellular target cell.

10. The apparatus according to claim 9, wherein the at least one memory and the computer program code are configured to, with the at least one processor, cause the apparatus at least further to:
if the information regarding unlicensed frequency network has not been received, determine to continue using the stored set of cellular network and unlicensed frequency network interworking parameters after the handover.

11. The apparatus according to claim 9, wherein the at least one memory and the computer program code are configured to, with the at least one processor, cause the apparatus at least further to:
if the information regarding unlicensed frequency network has not been received, determine to stop using the stored set of cellular network and unlicensed frequency network interworking parameters after the handover.

12. The apparatus according to claim 9, wherein the at least one memory and the computer program code are configured to, with the at least one processor, cause the apparatus at least further to:
if the information regarding unlicensed frequency network has been received, determine to stop using the stored set of cellular network and unlicensed frequency network interworking parameters and start using the second set of cellular network and unlicensed frequency network interworking parameters after the handover.

13. The apparatus according to claim 9, wherein the at least one memory and the computer program code are configured to, with the at least one processor, cause the apparatus at least further to:
receive at least one of an indicator indicating whether same information regarding unlicensed frequency network received from the cellular source cell can be used in the cellular target cell, and an indicator indicating whether to acquire information regarding unlicensed frequency network from the cellular target cell.

14. The apparatus according to claim 13, wherein the at least one memory and the computer program code are configured to, with the at least one processor, cause the apparatus at least further to:
if the received indicator indicating that same information regarding unlicensed frequency network received from the cellular source cell can be used in the cellular target cell, determine to use the second set of cellular network and unlicensed frequency network interworking parameters after the handover.

15. The apparatus according to claim 9, wherein the at least one memory and the computer program code are configured to, with the at least one processor, cause the apparatus at least further to:
receive an indicator indicating that information regarding unlicensed frequency network received from the cellular source cell can be used only in the cell where the information was received; in cells from a list of cells; in a public land mobile network; in certain carrier or frequency; in certain tracking area/routing area/location area; or during the time of validity.

16. The apparatus according to claim 15, wherein the at least one memory and the computer program code are configured to, with the at least one processor, cause the apparatus at least further to:
if the received indicator indicating that information regarding unlicensed frequency network received from the cellular source cell can be used in cells from a list of cells, and the cellular target cell belongs to the list of cells, determine to use the second set of cellular network and unlicensed frequency network interworking parameters after the handover.

17. A computer program product comprising a non-transitory computer-readable medium bearing computer program code embodied therein executable by a processor, the computer program code comprising:
code for receiving at a user equipment, and storing a set of cellular network and unlicensed frequency network interworking parameters from a cellular source cell;
code for offloading at the user equipment, data traffic from the cellular source cell to an unlicensed frequency network based on the stored set of interworking parameters;
code for receiving at the user equipment, a handover command from the cellular source cell to handover from the cellular source cell to a cellular target cell, wherein the handover command includes a second set of cellular network and unlicensed frequency network interworking parameters;
code for checking at the user equipment, whether information regarding unlicensed frequency network has been received from the cellular target cell after the handover; and
code for if the information regarding unlicensed frequency network has not been received, determining at the user equipment, whether to use the second set of cellular network and unlicensed frequency network interworking parameters for offloading data traffic from the cellular target cell to the unlicensed frequency network after the handover from the cellular source cell to the cellular target cell.

18. The computer program product according to claim 17, further comprising:
   code for if the information regarding unlicensed frequency network has not been received, determining to continue using the stored set of cellular network and unlicensed frequency network interworking parameters after the handover.

19. The computer program product according to claim 17, further comprising:
   code for if the information regarding unlicensed frequency network has not been received, determining to stop using the stored set of cellular network and unlicensed frequency network interworking parameters after the handover.

20. The computer program product according to claim 17, further comprising:
   code for if the information regarding unlicensed frequency network has been received, determining to stop using the stored set of cellular network and unlicensed frequency network interworking parameters and start using the second set of cellular network and unlicensed frequency network interworking parameters after the handover.

* * * * *